United States Patent [19]

Romano

[11] Patent Number: 5,479,776
[45] Date of Patent: Jan. 2, 1996

[54] CONTROL DEVICE OF A BICYCLE GEAR CHANGE

[75] Inventor: Antonio Romano, Padova, Italy

[73] Assignee: Campagnolo S.r.L., Vicenza, Italy

[21] Appl. No.: 214,488

[22] Filed: Mar. 18, 1994

[30] Foreign Application Priority Data

Apr. 20, 1993 [IT] Italy .................. TO93A0263

[51] Int. Cl.[6] .................. F16C 1/10; G05G 11/00
[52] U.S. Cl. .................. 74/502.2; 74/489; 74/475; 192/4 R
[58] Field of Search .................. 74/502.2, 489, 74/475, 488; 192/4 R

[56] References Cited

U.S. PATENT DOCUMENTS

| 3,478,617 | 11/1969 | Maeda | 74/502.2 |
|---|---|---|---|
| 4,100,820 | 7/1978 | Evett | 74/483 |
| 4,132,296 | 1/1979 | Evett | 192/4 R |
| 4,319,673 | 3/1982 | Kojima | 192/4 R |
| 5,052,241 | 10/1991 | Nagano | 74/475 X |
| 5,186,071 | 2/1993 | Iwasaki | 74/502.2 X |
| 5,257,683 | 11/1993 | Romano | 192/4 R |
| 5,361,645 | 11/1994 | Feng et al. | 74/489 X |

FOREIGN PATENT DOCUMENTS

| 0509457 | 10/1992 | European Pat. Off. | 74/502.2 |
|---|---|---|---|
| 2-88384 | 3/1990 | Japan | 74/502.2 |

Primary Examiner—Vinh T. Luong
Attorney, Agent, or Firm—Sughrue, Mion, Zinn, Macpeak & Seas

[57] ABSTRACT

A control device for the gear change of a bicycle comprises a single operating lever, preferably provided with two distinct arms for the gear change up shifting and down shifting, respectively, to which a ratchet mechanism is associated. The ratchet mechanism comprises a pair of opposed teeth adapted to cooperate with a ratchet wheel which is associated to a control rotor. In the application on a racing bicycle, the control rotor is rotatably mounted around an axis parallel to the longitudinal direction of the bicycle.

3 Claims, 3 Drawing Sheets

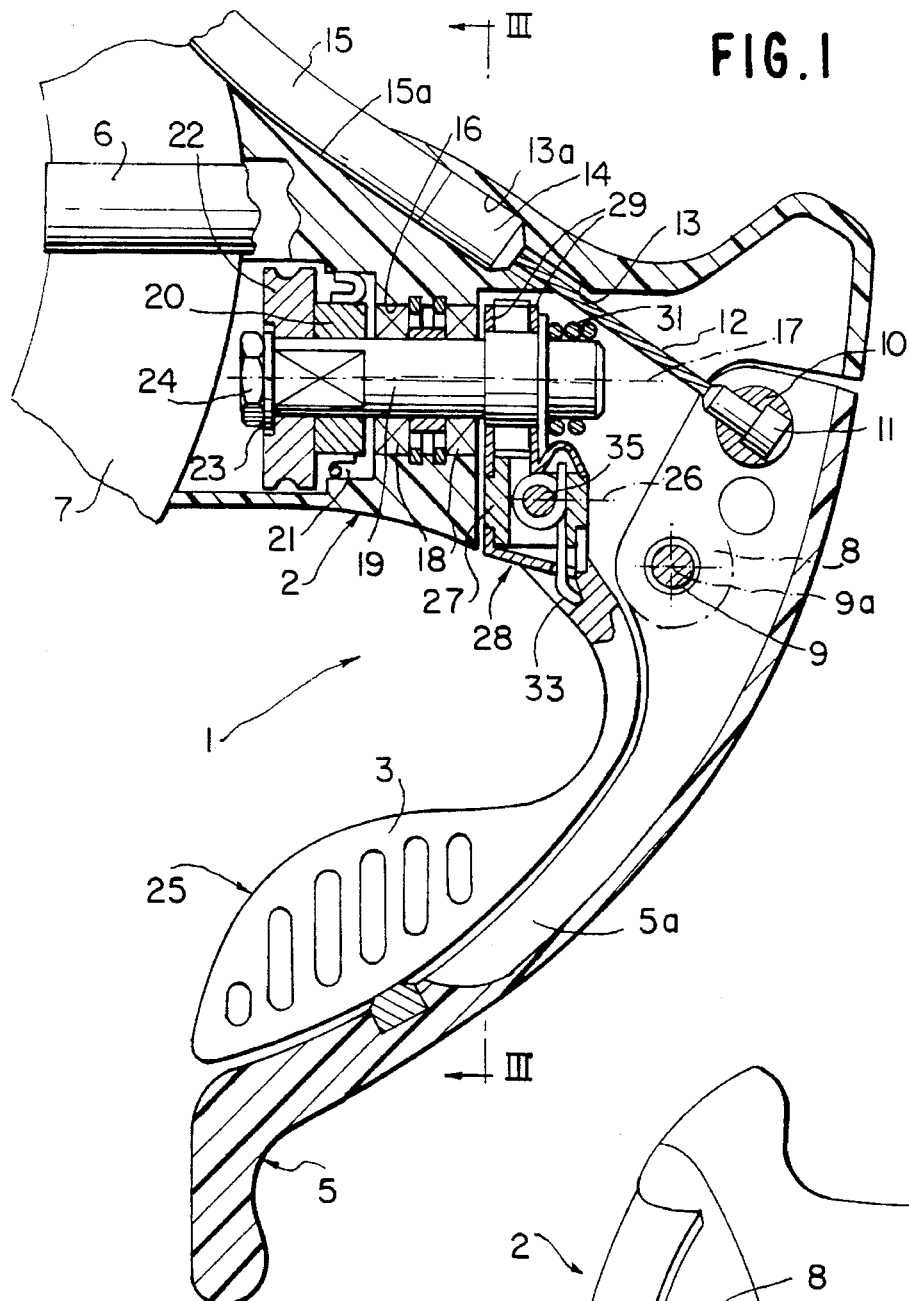

CONTROL DEVICE OF A BICYCLE GEAR CHANGE

BACKGROUND OF THE INVENTION

The present invention is related to a control device of a bicycle gear change. In particular, the invention is directed to control devices of known type comprising:

a support body intended to be fixed onto the handle bar of the bicycle, a gear change operating rotor, rotatably mounted in the support body and carrying winding up means for a gear change flexible control cable, indexing means carried by the operating rotor and by the support body and adapted to cooperate therebetween so as to define a plurality of steady positions of said operating rotor corresponding to engagement of the various speed ratios which can be selected with the gear change, ratchet means for rotating the gear change operating rotor in one or in the other direction, said ratchet means comprising a single ratchet wheel rigidly connected to the operating rotor and a single operating lever swingably mounted on an intermediate support member which is in turn rotatably mounted around the axis of the operating rotor, said operating lever having an active end defining a pair of opposed teeth adapted to cooperate with said ratchet wheel for operating rotation in one direction or, respectively, in the other direction of said wheel and perform consequent gear change up shifting or down shifting selection.

A control device of the above disclosed type is shown for example in German Patent application DE-A-3136922. This known solution is related to an application for a racing bicycle and employs the support body of one of the brake control levers of the bicycle as the support body also for the gear change control device. Further, in this known solution a gear is provided for, acting both as the ratchet wheel of the ratchet mechanism, and as indexing toothed wheel, cooperating with a stop pawl for providing reference of the various operative positions of the gear change. This solution is thus difficult to be put into practice, since the two above disclosed functions would require different conformations of the toothed wheel. Moreover, the position of the operating lever, when same is inoperative, is not exactly defined, which makes the device hardly applicable in practical terms and subjected to failures.

Lastly it is to be pointed out that in the application onto the handle bar of a racing bicycle according to the above mentioned prior document, the operating lever is rotatable around an axis which is parallel to the pivoting axis of the brake control lever, which does not allow comfortable manoeuvring by the cyclist.

In recent years, a tendency has more and more developed to provide gear change control devices which on one hand are provided with a high operation efficiency, and on the other hand enable the cyclist to perform operation in an easy and quick way, without abandoning firm grasp of the handle bar. This need is particularly felt in the case of racing bicycles, since it is required that the cyclist can pay all his attention on the competition, as well as in the case of climbing bicycles (or "mountain-bikes"), wherein steady gripping of the handle bar is necessary for ensuring the equilibrium on uneven ground.

In the attempt to satisfy the above needs, several types of change gear control devices have been proposed in the past, sometimes in an integrated form with the brake control device. Devices of this type are shown for instance in U.S. Pat. No. A 4,100,820 and U.S. Pat. No. A 4,132,926. These documents show an assembly wherein the gear change control device comprises an operating lever projecting through a slit from the support body and having its end within the body which is rotatably mounted in the support body and is used for winding up the gear change flexible control cable. This member is subjected to the action of a friction mechanism which is sufficient to oppose the usual spring which is associated with the gear change derailer, so as to guarantee that the gear change operating lever remains in the selected position. Such a solution is unsatisfactory mainly for two reasons. Firstly, nowadays the use of gear change control devices of the indexed type has become more and more popular, since enabling the cyclist to have a certain reference of the operating lever corresponding to the various speed ratios which can be selected. Secondly, the gear change operating lever which is provided for in said known device can not always be easily and conveniently operated by the cyclist. In particular, operation thereof can be difficult in one of the two directions of rotation of the lever and when the lever is to be operated starting from some of the different possible operative positions thereof.

Fundamentally the same drawbacks exist even in the case of other known devices, such as those shown in U.S. Pat. No. A 3,478,617, in European Patent application EP-A-352732 and in German patent application DE-A-3916919. These three last documents, additionally, show control devices in which the brake lever and the gear change operating lever are pivotally mounted around parallel axis, which involves, as already pointed out, an uncomfortable manoeuvring of the gear change, at least when the gear change lever must be rotated forwardly.

It has also been proposed (see European Patent application EP-A-371254) to provide an integrated brake and gear change control assembly in which the brake lever itself, which is able to rotate around two mutually perpendicular axis, can act also as the gear change operating lever. This solution however has the inconvenience of requiring the use of a complex mechanism constituted by a huge number of components.

It has also been proposed (see International Patent application PCT/GB90/00220) a control assembly wherein the gear change operating lever is separated from the brake lever but is articulated to the body of the brake lever. Even in this case, the pivoting axis of the gear change operating lever is parallel to the pivoting axis of the brake lever and operation of the gear change is not always easy. Furthermore, the same Applicant has already proposed, in Italian patent application TO91A000167 and in the corresponding European patent application 92830101.9, a control device of a bicycle gear change comprising a support body constituted by the same support body of the brake lever and a gear change operating rotor which is rotatably mounted within the support body and can be driven in one and in the opposite direction by means of two ratchet devices separated from each other. This device further comprises indexing means of the type set forth at the beginning of the present specification. Each of the two ratchet devices comprises an operating lever articulated onto an intermediate support element which is in turn rotatably mounted around the axis of the operating rotor. Each ratchet device further comprises first resilient means urging the respective operating lever towards a rest position wherein one tooth carried by the operating lever is spaced apart from the respective ratchet wheel, and second resilient means, having a load greater than the load of the first resilient means, which are always urging the respective intermediate support member towards a same limit stop position wherein the operating lever can be easily reached.

The above device previously proposed by the Applicant is fully satisfactory under the operative point of view by virtue of a series of advantages: firstly, after each operation, the lever of each ratchet device is set again in the same position, which can be easily reached by the fingers of the cyclist's hand without any need of abandoning a correct grip of the handle bar. Secondly, each of the said levers is operable by a single operation so as to produce shifting even through several speed ratios. Further, in the application shown in the above-referenced patent document of the same Applicant, which is related to a racing bicycle, the axis of the gear change operating rotor is parallel to the longitudinal direction of the bicycle in the mounted condition, which enables positioning of the gear change up shifting, and, respectively, down shifting levers in the most suitable locations for easy handling thereof by the fingers of the cyclist's hand. This arrangement further allows passage of the operating cable inside or in close proximity of the handle bar tube.

In a subsequent patent application of the same Applicant (Italian patent application n. TO92A000316 of 07.04.1992), which is unpublished at the filing date of the present application, an improvement of the previously proposed device has been presented, wherein the support body of the device is not the support body of the brake operating lever, so as to enable convenient application of the device itself even onto bicycles of the "mountain-bike" type.

SUMMARY OF THE INVENTION

The object of the present invention is to further improve the devices previously proposed by the Applicant, maintaining all the advantages thereof with respect to the prior art as far as operative efficiency, reliability, and manoeuvring comfort and velocity are concerned, while improving same in terms of constructive simplicity and manufacturing economy.

In order to achieve the above object, the present invention is directed to a control device of a bicycle gear change, comprising:

- a support body intended to be fixed onto the bicycle handle bar,
- a gear change operating rotor, rotatably mounted in the support body and carrying winding up means of a gear change flexible control cable,
- indexing means carried by the operating rotor and by the support body, adapted to cooperate therebetween so as to define a plurality of steady positions of said operating rotor corresponding to engagement of the various transmission ratios which can be selected with the gear change,
- ratchet means for rotating the gear change operating rotor in one or in the other direction, said ratchet means comprising a single ratchet wheel rigidly connected to the operating rotor and a single operating lever swingably mounted on an intermediate support member which is in turn rotatably mounted around the axis of the operating rotor, said operating lever having an active end defining a pair of opposed teeth adapted to cooperate with said ratchet wheel for operating rotation in one or in the other direction, respectively, of said wheel and perform consequent up shifting or down shifting selection of the various gear change speeds, characterised in that said ratchet device is completely separated from said indexing means and comprises first resilient means urging the operating lever towards a rest position in which the said teeth are both spaced apart from the respective ratchet wheel, and second resilient means, having a greater load than the first resilient means, always urging the intermediate support member towards a same rest position, in which the operating lever can easily be reached. In the case of application to a racing bicycle, said support body is the support body of a brake operating lever of the bicycle and said operating rotor is rotatably mounted in the support body around an axis perpendicular to the articulation axis of the brake lever, which is parallel to the longitudinal direction of the bicycle in the mounted condition.

In this case the operating lever comprises a single body having however two substantially mutually perpendicular arms, one of which is placed substantially parallel to the brake lever and the other is placed along a transverse direction with respect to the vertical plane of the bicycle. In this way, the said two arms can easily be reached by the cyclist's hand without abandoning the correct grip of the handle bar. The first arm can be pushed transversely towards the interior of the bicycle so as to produce speed ratio up shifting, while the second arm can be pushed downwardly by the thumb of the hand so as to cause speed ratio down shifting. Both arms project from the support body through slots having such a width as to allow shifting through several transmission ratios in a single operation. Due to the disposition of the axis of the operating rotor, which is parallel to the longitudinal direction of the bicycle, it is maintained the advantage of the mechanism already proposed by the Applicant, related to the hidden disposition of the operating cable.

In case of application to a "mountain-bike", the support body is directly fixed to the bicycle handle bar in a position adapted to obtain easy reaching of the operating lever by the fingers of the cyclist's hand, even in this case without any need of abandoning the correct grip of the handle bar.

As it is evident from the above statement, the distinguishing feature of the invention with respect to the device known from German document DE-A-3136922 resides in that, according to the invention, two separate toothed wheels are provided for making up the indexing means and for making up the ratchet means, respectively. This enables manufacturing each wheel in the best suitable way for the respective function, so as to obtain a reliable operation of the device. Moreover, resilient means are provided for, which guarantee return of the operating lever always back in a same position, which can be easily reached by the cyclist's hand, following any gear change operation. In case of application to a racing bicycle, the invention further affords the advantage of a more convenient manoeuvring, by virtue of the fact that the operating lever is rotatably mounted around an axis which is parallel to the longitudinal direction of the bicycle.

In comparison with the device previously proposed by the same Applicant, the invention has the advantage of a remarkable constructive simplification, due to the provision of a single ratchet device with a single operating lever of the gear change both for up shifting and for down shifting selection. The provision of a single operating lever does not decrease manoeuvring convenience, since it is anyway possible, according to the invention, providing this operating lever with two arms arranged in the best way so as to be able to be easily reached by the cyclist's fingers.

The present invention, therefore, has all the advantages of reliability, comfort and operation rapidity of the device previously proposed by the same Applicant, while further improving same from the point of view of construction simplicity and manufacturing economy.

BRIEF DESCRIPTION OF THE DRAWINGS

Further features and advantages of the invention will become apparent from the following description with reference to the annexed drawings, purely provided by way of non limiting example, wherein:

FIG. 1 is a sectioned view of a preferred embodiment of the device according to the invention, applied onto a racing bicycle, FIG. 2 is a perspective view of the assembly including the device of FIG. 1.

DETAILED DESCRIPTION OF THE INVENTION

Figure 5:
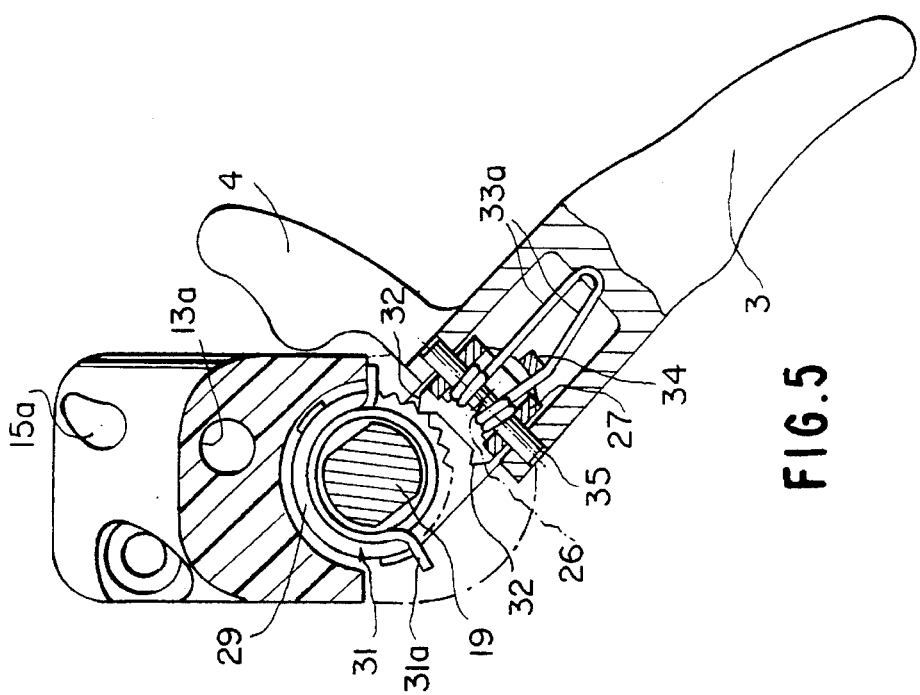

The embodiment of the present invention which is depicted in FIGS. 1–5 constitutes a development of the device shown in the prior Italian patent application TO91A000167 of the same applicant, corresponding to European patent application n. 92830101.9. In FIG. 1, reference 1 generally designates an integrated gear change and brake control device of a bicycle, having a support body 2, for instance made of synthetic material, carrying a gear change operating lever having two arms 3 and 4 and the brake operating lever 5. As it is shown in detail in the above-identified patent application of the same Applicant, the support body 2 is provided with a clamp 6 which is adapted to be tightened around a tubular end portion 7 of the handle bar of a racing bicycle.

The support body 2 is provided in its front area, in a way known per se, with two lateral walls 8 to which the ends of a pin 9 for articulation of the brake operating lever 5 are connected. The lever 5 is preferably made of a light alloy and has a substantially U shaped transverse section with two lateral wings 5a which are engaged by the pivot pin 9. The two wings 5a also support a block 10 to which the terminal 11 of a flexible metal wire 12 for the brake control is anchored. The cable 12 exits from the support body 2 through a hole 13 formed in the upper wall of the support body 2 and having an elongated portion 13a on the bottom wall of which bears the end 14 of a sheath 15 associated to the flexible cable 12. The portion of the sheath 15 coming out from the support body 2 is resting against a seat 15a of the body 2 and is guided parallel to the tube 7 constituting the handle bar, adjacent thereto (see also FIG. 3).

In the condition of normal use of the bicycle, the axis 9a of the pivot pin 9 of the brake operating lever 5 is directed horizontally and transversally with respect to the longitudinal plane of the bicycle. The cable 12 is subjected to the return action determined by the spring associated to the brake device, thus tending to rotate the lever 5 around the relative axis 9a in an anti-clockwise direction (with reference to FIG. 1). The lever 5 is further provided with a stop pin, not shown in the annexed drawings, which is similar to that shown with reference to FIG. 9 in the above-identified patent application of the same Applicant. Starting from the rest position thereof, the lever 5 can be rotated in the clockwise direction (with reference to FIG. 1), so as to pull the cable 12 and thus operate the brake.

The support body 2 has a cylindrical bore 16 the axis 17 of which is perpendicular to the articulation axis 9a of the brake lever 5 and is parallel to the longitudinal direction of the bicycle in the mounted condition of the assembly. A shaft 19 for operating the bicycle gear change is rotatably mounted within the bore 16, by means of two roller bearings 18 (which may be replaced by a bush). The shaft 19 has a non-circular cross section portion on which a toothed wheel 20 is splined, which cooperates with two wire springs 21, in a way known per se by the above-identified prior patent application of the same Applicant (see FIG. 4 of this application). Each of the wire springs 21 has one end anchored to the support body and the opposite end elastically engaged within a space of the toothed surface of the wheel 20. The toothed wheel 20 and the two wire springs 21 cooperate therebetween so as to constitute indexing means adapted to define a plurality of steady positions of the control shaft 19, which in turn constitutes the gear change operating rotor. These steady positions correspond to engagement of the various speed ratios which can be selected by the gear change. A pulley 22 is also splined on the shaft 19 and has a circumferential groove for the winding up of a gear change flexible control cable, not shown in the annexed drawings, but anyhow arranged like the one illustrated in FIG. 2 of the drawings annexed to the prior applicant's application. The two wheels 20, 22 are axially maintained in position by a ring 23 and a nut 24 screwed onto a threaded end portion of the shaft 19.

Figure 4:
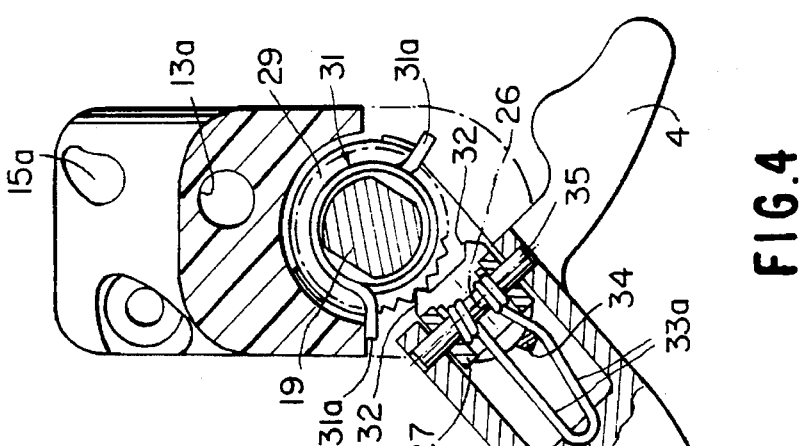
Figure 3:
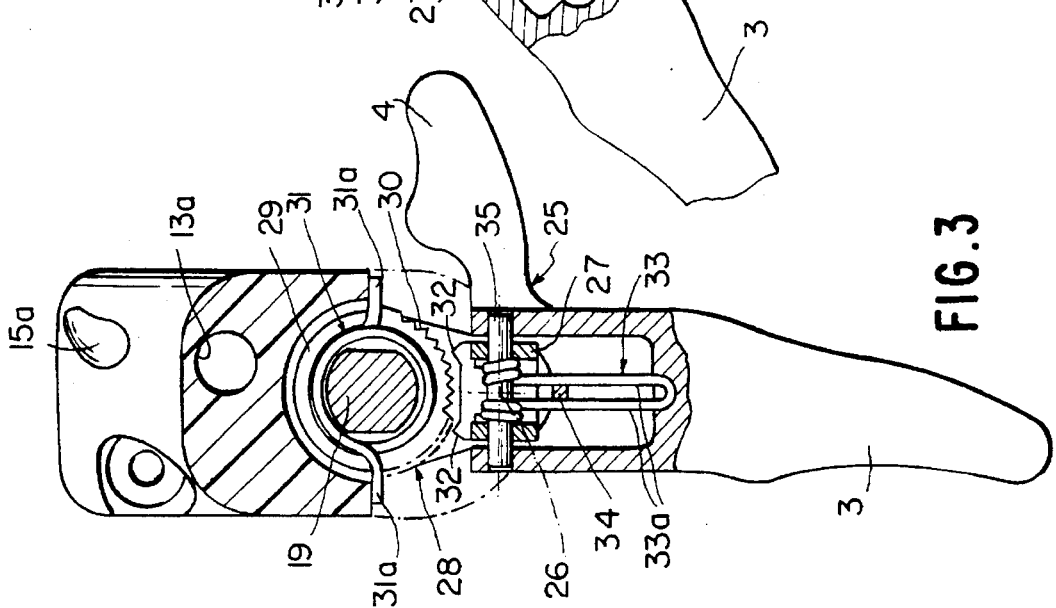
FIG. 3 is a sectioned and enlarged view along line III—III of FIG. 1, FIGS. 4, 5 show two different operative positions with respect to the one shown in FIG. 3.

Referring also to FIGS. 3–5, the operating rotor constituted by the shaft 19 and by the wheel 22 can be rotated by means of a single operating lever (differently from what is contemplated in the prior applicant's application), having first and second operating arms 3, 4 substantially arranged along mutually perpendicular directions. The operating lever, generally indicated by the reference numeral 25, is rotatably mounted around an axis 26 parallel to the axis 17 on a body 27 which is fixed to an intermediate support member 28. The intermediate support member 28 is in turn rotatably mounted on a front portion of the shaft 19 around the axis 17 of this shaft. The intermediate support member 28 comprises a pair of parallel sheet metal plates 29 having a substantially circular form, rotatably mounted on the shaft 19 and having radially projecting appendages to which the body 27 is fixed. A toothed ratchet wheel 30, whose teeth have a symmetrical profile, is splined onto the same portion of the shaft 19 on which the plates 29 are rotatably mounted. Moreover, a spiral spring 31 is interposed between the support body 2 and the intermediate member 28. The spring 31 has on one side two tongs 31a reacting against the support body 2, and at the other end a tang (not shown in the drawings) associated to the intermediate support member 28. Therefore, the spring 31 tends to bring the intermediate support member 28 again to the position shown in FIG. 3 when same is rotated around the axis 17 either in one direction or in the other direction, by means of the operating lever 25, as it will be disclosed in detail hereinafter. The body 27 which is rotatably mounted around the axis 26 on the intermediate support member 28 has an active face with two opposed teeth 32 both adapted to act as ratchet pawls, as it will also be disclosed in the following.

Lastly, between the body 27 and the lever 25 a wire spring 33 is interposed, having a U-portion 33a the two branches of which are placed laterally of a pin 34 of the member 28. The ends of these branches are spiral wound around a pin 35 whose axis is parallel to the articulation axis 9a of the brake lever 5, and which is intended for articulation of the lever 25, enabling the latter to avoid interference with the lever 5 when the brake is operated. The spring 33 has also the function of urging the arm 3 of the lever 25 against the brake lever 5.

Operation of the above-disclosed device is as follows. When the brake lever 5 is actuated, the latter can operate normally, since the arm 3 of the operating lever 25 can rotate around the pin 35. When instead the bicycle gear change is to be actuated, the operating lever 25 must be operated. More precisely, if the cyclist intends to perform gear change up shifting, he must push with the fingers of his hand the arm 3 so as to displace it laterally towards the interior of the bicycle. This movement is firstly accomplished overcoming the resistance of one of the two branches of the U portion 33a of the spring 33 against the pin 34 (see FIG. 5), since the load of this spring is lower than the load of the spring 31, whereby the first displacement of the lever 25 occurs without producing any movement of the intermediate support member 28. Following this first movement, one of the two teeth 32 comes into engagement within a corresponding space between the teeth of the toothed wheel 30.

After this approaching movement, a further displacement of the arm 3 to the right (with reference to FIGS. 3, 5) causes rotation of the intermediate support member 28 around the axis 17, thus producing actuation of the gear change. The movement is naturally accompanied by the snap engagement of the indexing means 20, 21, which give to the cyclist the sensation of the various operative positions of the gear change.

After reaching the desired speed ratio, the cyclist interrupts the action onto the operating lever 25, whereby the first spring 31 and the second spring 33 bring the assembly of the intermediate support member 22 and lever 25 again into the neutral position shown in FIG. 3. This position is the most convenient for the cyclist. Therefore, further operation of the gear change is always made easy, whichever be the speed ratio previously selected by the cyclist. If the gear change is to be operated towards down shifting, the cyclist acts with his thumb onto the arm 4 pushing same downwardly according to a manoeuvre which is totally analogous to the one previously disclosed (see FIG. 4). Even in this case, the first displacement of the lever 25 will simply cause approaching of the tooth 32 (the one on the left, with reference to FIGS. 3, 4) to the toothed wheel 30 and, therefore, rotation of the intermediate support member and of the control shaft 19 therewith.

Figure 6:
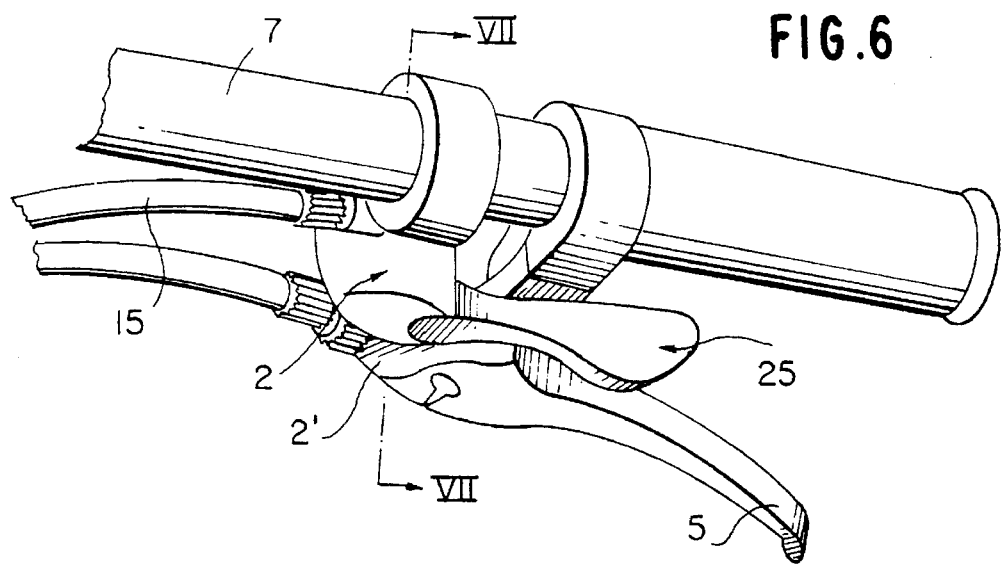
FIG. 6 is a perspective view of a further preferred embodiment of the invention, applied onto a "mountain-bike"
Figure 7:
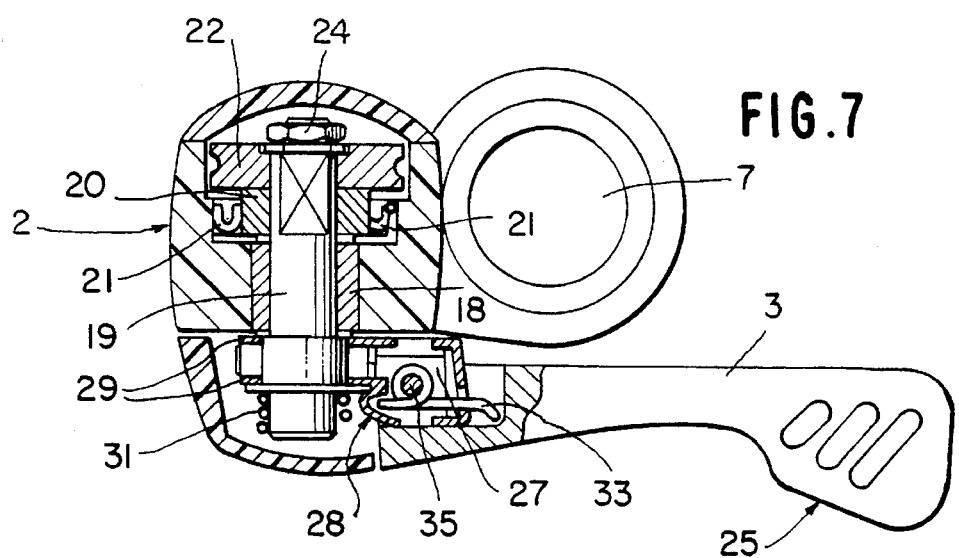
FIG. 7 is a sectioned and enlarged view of the device of FIG. 6.
Figure 8:
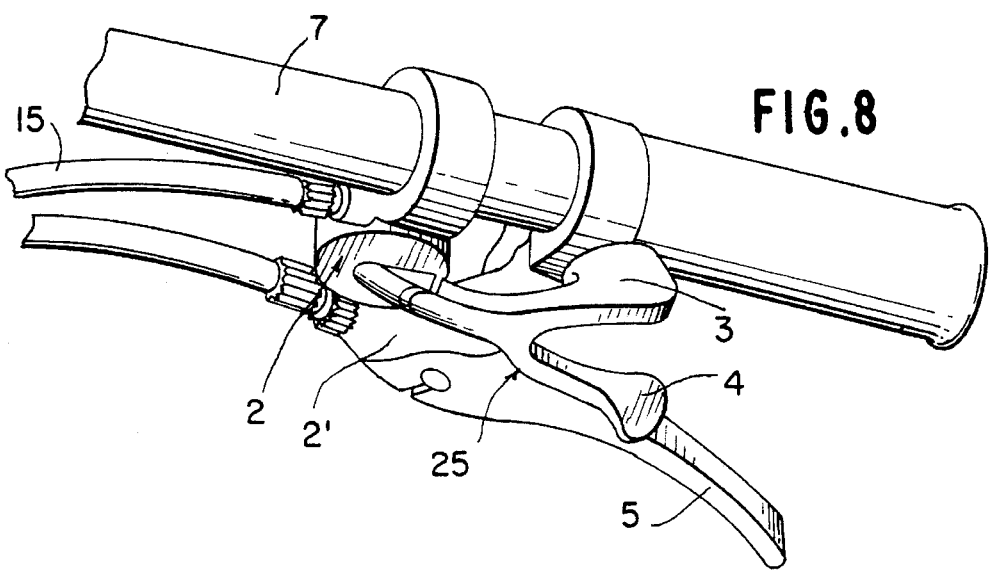
FIG. 8 shows a variant of FIG. 6.

FIGS. 6 and 7 are related to the application of the above-disclosed device to a "mountain-bike". In this case, the support body 2 is distinct from the support body 2' of the brake lever. Moreover, an operating lever 25 can be provided for, comprising a single arm (FIG. 6) or two arms 3, 4 (FIG. 8), arranged in the most convenient positions for actuation thereof.

In FIG. 7, the various components of the device corresponding to those of the device according to FIG. 1 are indicated by the same reference numerals. As it can be seen, the structure and operation are in this case totally analogous to those disclosed in the above with reference to the embodiment shown in FIG. 1.

Naturally, the details of construction and the embodiments may be widely varied with respect to what has been disclosed and illustrated purely by way of example, without thereby departing from the scope of the present invention such as defined in the appended claims.

What is claimed is:

1. A control device for a gear change mechanism, for a bicycle having a handle bar, said control device comprising:

a gear change flexible control cable, a support body fixable onto the handle bar of the bicycle, a gear change operating rotor having an axis and rotatably mounted in the support body for rotation in opposite directions around said axis, said operating rotor carrying winding up means for said gear change flexible control cable, indexing means carried by the operating rotor and by the support body, respectively, and adapted to cooperate therebetween so as to define a plurality of steady positions of said operating rotor corresponding to engagement of the various speed ratios which can be selected with the gear change mechanism, an intermediate support member rotatably mounted on said axis of the operating rotor, ratchet means for rotating the gear change operating rotor in opposite directions, said ratchet means comprising a single ratchet wheel rigidly connected to the operating rotor and a single operating lever swingably mounted on said intermediate support member, said operating lever having an active portion defining a pair of opposed teeth adapted to cooperate with said ratchet wheel for operating rotation in opposite directions of said wheel to perform gear change up shifting or down shifting selection, wherein said ratchet means is completely separated from said indexing means and comprises first resilient means always urging the intermediate support member towards a same rest position in which the operating lever can easily be reached, and second resilient means having a load lower than the load of the first resilient means urging the operating lever towards a rest position in which said teeth are both spaced apart from the ratchet wheel.

2. A control device according to claim 1, wherein the bicycle has a longitudinal direction and at least one brake operating lever and wherein said support body is the support body for the brake operating lever, said operating rotor being rotatably mounted in the support body around an axis which is parallel to the longitudinal direction of the bicycle in the mounted condition of the device, and said operating lever having a first arm arranged substantially parallel to the brake operating lever, rearwardly thereof, and a second arm substantially perpendicular to said first arm and projecting transversely inwardly of the bicycle.

3. An control device according to claim 1, further comprising a brake operating lever and an additional support body for the brake operating lever and wherein said single operating lever has two arms extending adjacent the handle bar.

* * * * *